US012347322B2

(12) United States Patent
Li et al.

(10) Patent No.: US 12,347,322 B2
(45) Date of Patent: Jul. 1, 2025

(54) UNMANNED AIRCRAFT IDENTITY MODULE AND STORAGE METHOD (71) Applicant: HUAWEI TECHNOLOGIES CO., LTD., Shenzhen (CN)

(72) Inventors: Gang Li, Shanghai (CN); HaiYing Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 693 days.

(21) Appl. No.: 17/543,001

(22) Filed: Dec. 6, 2021

(65) Prior Publication Data

US 2022/0092989 A1  Mar. 24, 2022

Related U.S. Application Data

(63) Continuation of application No. PCT/CN2020/093001, filed on May 28, 2020.

(30) Foreign Application Priority Data

Jun. 5, 2019  (CN) .......................... 201910486503.7

(51) Int. Cl.
*G08G 5/21* (2025.01)
*B64U 10/13* (2023.01)
(Continued)

(52) U.S. Cl.
CPC .............. *G08G 5/20* (2025.01); *B64U 10/13* (2023.01); *G08G 5/22* (2025.01); *H04W 8/183* (2013.01); *B64U 2201/20* (2023.01); *H04W 4/40* (2018.02)

(58) Field of Classification Search
None
See application file for complete search history.

(56) References Cited

U.S. PATENT DOCUMENTS 9,412,278 B1 * 8/2016 Gong .................. G08G 5/26
9,489,813 B1   11/2016 Beigel
(Continued)

FOREIGN PATENT DOCUMENTS

CN   101788958 A   7/2010
CN   102915576 A   2/2013
(Continued)

OTHER PUBLICATIONS

Wenjing Ma China Electronics Standardization Institute P R China: "Revised Base text of ITU-T X. uav-oid: Identification mechanism for unmanned aerial vehicles using object identifiers; TD1887R4", XP044261093 , total 19 pages.
(Continued)

*Primary Examiner* — Jonathan M Dager
(74) *Attorney, Agent, or Firm* — HAUPTMAN HAM, LLP

(57) ABSTRACT

An unmanned aircraft identity module and a storage method relate to the field of electronic technologies, and implement information reading and information tracking of an unmanned aircraft over a whole life cycle thereof. The method includes: obtaining a physical identifier of an unmanned aircraft, and writing the physical identifier into a non-rewritable memory area, where the physical identifier is an unmodifiable hardware identifier of the unmanned aircraft; obtaining an access identifier of the unmanned aircraft, and writing the access identifier into an authorizedly rewritable memory area, where the access identifier is a subscription service identifier of the unmanned aircraft; and obtaining an application identifier of the unmanned aircraft, and writing the application identifier into a repeatedly rewritable memory area, where the application identifier is a flight-related identifier of the unmanned aircraft.

17 Claims, 5 Drawing Sheets

Unmanned aircraft

User

Management device (51) Int. Cl.
  *G08G 5/20*  (2025.01)
  *G08G 5/22*  (2025.01)
  *H04W 8/18*  (2009.01)
  *H04W 4/40*  (2018.01)

(56) References Cited

U.S. PATENT DOCUMENTS

| | | | |
|---|---|---|---|
| 9,821,910 B1* | 11/2017 | Suiter | G08G 5/57 |
| 10,126,136 B2* | 11/2018 | Lagnemma | G01C 21/34 |
| 10,401,183 B2* | 9/2019 | Biswas | H04W 12/02 |
| 10,663,597 B1* | 5/2020 | Dormiani | G08G 5/25 |
| 10,710,607 B2* | 7/2020 | Peterson | B60W 50/12 |
| 10,733,894 B1* | 8/2020 | Beard | G01C 21/20 |
| 10,825,345 B2* | 11/2020 | Sugahara | G08G 5/0069 |
| 11,272,418 B2* | 3/2022 | Takeda | H04W 36/00837 |
| 11,543,259 B2* | 1/2023 | Gokhale | G01C 21/3461 |
| 11,651,694 B1* | 5/2023 | Guthrie | B64D 45/0015 701/3 |
| 11,837,100 B2* | 12/2023 | Jensen | G08G 5/00 |
| 12,014,640 B1* | 6/2024 | Manouchehri | H04L 63/083 |
| 12,033,516 B1* | 7/2024 | Pierce | G08G 5/55 |
| 2012/0083964 A1* | 4/2012 | Montemerlo | B60T 8/17 701/25 |
| 2015/0325064 A1* | 11/2015 | Downey | G05D 1/226 701/29.3 |
| 2016/0025505 A1* | 1/2016 | Oh | G05D 1/0217 701/23 |
| 2017/0067750 A1* | 3/2017 | Day | G08G 1/096783 |
| 2017/0255802 A1* | 9/2017 | Falk | G08G 5/26 |
| 2018/0046180 A1* | 2/2018 | Falk | G08G 5/21 |
| 2018/0051995 A1* | 2/2018 | Delling | G08G 1/096883 |
| 2018/0066960 A1* | 3/2018 | Tateishi | G05D 1/0274 |
| 2018/0090012 A1* | 3/2018 | Jo | G08G 5/55 |
| 2018/0120829 A1* | 5/2018 | Price | G05D 1/2246 |
| 2018/0120832 A1* | 5/2018 | Hintze | G06Q 50/40 |
| 2018/0129881 A1* | 5/2018 | Seeber | G08G 5/22 |
| 2018/0218619 A1 | 8/2018 | Brown et al. | |
| 2018/0253978 A1* | 9/2018 | Tabuchi | G08G 5/55 |
| 2018/0262501 A1* | 9/2018 | Sugahara | H04L 63/0876 |
| 2018/0273202 A1* | 9/2018 | Liu | B64D 47/06 |
| 2019/0019418 A1* | 1/2019 | Tantardini | G05D 1/104 |
| 2019/0114925 A1* | 4/2019 | Schulman | G08G 5/57 |
| 2019/0294167 A1* | 9/2019 | Kutila | G08G 1/096827 |
| 2020/0279492 A1* | 9/2020 | Neal | G05D 1/0022 |
| 2021/0048825 A1* | 2/2021 | Elvitigala | B60W 60/0023 |
| 2021/0074166 A1* | 3/2021 | Chang | G08G 5/59 |
| 2021/0108929 A1* | 4/2021 | Zhang | G01C 21/3438 |
| 2021/0118312 A1* | 4/2021 | Takács | H04W 28/021 |
| 2021/0146944 A1* | 5/2021 | Kundu | B60W 50/085 |
| 2021/0209954 A1* | 7/2021 | Tazume | G05D 1/101 |
| 2021/0264793 A1* | 8/2021 | Shuman | H04W 52/327 |
| 2021/0264799 A1* | 8/2021 | Belt | B64U 80/70 |
| 2021/0274311 A1* | 9/2021 | Mahkonen | G08G 5/55 |
| 2022/0065644 A1* | 3/2022 | Kundu | G01C 21/3446 |
| 2022/0089181 A1* | 3/2022 | Gross | G07C 5/0841 |
| 2023/0080281 A1* | 3/2023 | Kundu | G06N 5/022 701/410 |
| 2023/0156464 A1* | 5/2023 | Faccin | H04L 63/062 380/270 |
| 2024/0118096 A1* | 4/2024 | Kundu | B60L 53/12 |
| 2024/0248725 A1* | 7/2024 | Sundararaj | G05D 1/042 |
| 2024/0274016 A1* | 8/2024 | Agrawal | G08G 5/59 |

FOREIGN PATENT DOCUMENTS

| | | |
|---|---|---|
| CN | 103578300 A | 2/2014 |
| CN | 106937275 A | 7/2017 |
| CN | 107609612 A | 1/2018 |
| CN | 207115471 U | 3/2018 |
| CN | 108028024 A | 5/2018 |
| JP | 2008105591 A | 5/2008 |
| WO | 2018058338 A1 | 4/2018 |

OTHER PUBLICATIONS

Extended European Search Report issued in corresponding European Application No. 20818728.6, dated Jun. 17, 2022, pp. 1-6.
Measures for air traffic management of civil unmanned aerial vehicle systems. MD-TM-2016-004, Sep. 21, 2016, 24 pages.
Dr.Tak Seung-Ho, NWI Proposal: Drone Operator's License, Drone Controller's License, Drone Driver's License, Drone Identify Module. ISO/IEC JTC 1/SC 17, N 5897, Oct. 17, 2016, 29 pages.
ISO/IEC JTC 1/SC 17/WG 12 N17, Call for contributions on ISO/IEC 22460: Part 2 : Drone Identity module(DIM) and Part 5 : Test Methods for Drone Identity Module (DIM). Apr. 30, 2018, 2 pages.
ISO/IEC JTC 1/SC 17/WG 12 N 72. ISO/IEC JTC 1/SC 17 N, ISO/IEC WD 22460-3:2019(E), ISO/IEC JTC 1/SC 17/WG 12, Cards and security devices for personal identification—ISO Licence and Drone Identity Module for Drone (Ultla light vehicle or Unmanned aircraft system)—Part 3: Logical data structure, access control, authentication and integrity validation for Drone Licence, Mar. 28, 2019, 25 pages.
ISO/IEC JTC 1/SC 17/WG 12 N 67. ISO/IEC WD2 22460-2:2019(EN), Information Technology—Cards and security devices for personal identification—ISO License and Drone Identity Module for Drone(Ultra Light Vehicle or Unmanned aircraft system)—Part 2: Drone Identity Module. Feb. 7, 2019, 19 pages.
ISO/IEC JTC 1/SC 17/WG 12 N 60. ISO/IEC WD 22460-1:2018(E), Cards and security devices—ISO License and Drone Identity Module for Drone (Ultra Light Vehicle or Unmanned aircraft system)—Part 1: Physical Characteristics and Basic Data Set for Drone Licence. Apr. 17, 2018, 35 pages.
International Search Report issued in corresponding International Application No. PCT/CN2020/093001, dated Aug. 31, 2020, pp. 1-9.
Chinese Office Action issued in corresponding Chinese Application No. 201910486503.7, dated Jul. 14, 2021, pp. 1-9.
European Office Action issued in corresponding European Application No. 20818728.6, dated Mar. 19, 2025, pp. 1-4.

\* cited by examiner

FIG. 8

UNMANNED AIRCRAFT IDENTITY MODULE AND STORAGE METHOD

CROSS-REFERENCE TO RELATED APPLICATIONS

This application is a continuation of International Application No. PCT/CN2020/093001, filed on May 28, 2020, which claims priority to Chinese Patent Application No. 201910486503.7, filed on Jun. 5, 2019. The disclosures of the aforementioned applications are hereby incorporated by reference in their entireties.

TECHNICAL FIELD

Embodiments of this application relate to the field of electronic technologies, and in particular, to an unmanned aircraft identity module and storage method.

BACKGROUND

As an emerging technology product, unmanned aircrafts have developed rapidly in recent years. A quantity of civil unmanned aircrafts is growing, but most unmanned aircraft flights are unmonitored and unmanaged flights. Therefore, there is an urgent need to formulate related standards for the unmanned aircrafts.

In December 2017, the Ministry of Industry and Information Technology issued the "Guidance on Promoting and Standardizing Development of Manufacturing Industry of Civil Unmanned aircrafts", which states: "promote formation of a technology management and control system of which a civil unmanned aircraft is identifiable, monitorable, and traceable". Security management and control technologies are continuously improved. A national-level security management and control platform is basically established, and an enterprise-level supervision platform basically achieves full coverage. All civil unmanned aircraft products implement "one identifier per vehicle", a rate of automatically identifying the civil unmanned aircraft reaches 100%, and the civil unmanned aircraft meets a functional requirement of accessing the management and control platform. Different from a conventional hardware device identifier, "one identifier per vehicle" means that the unmanned aircraft is identified, managed and controlled in a whole life cycle of the unmanned aircraft by using a group of identities.

As the basis of unmanned aircraft application and management, an unmanned aircraft identity is valued by domestic and foreign industries and standardization organizations and is a primary condition of unmanned aircraft development. Related technical standards, an architecture and a process of unmanned aircraft management, and the like need to be formulated based on the unmanned aircraft identity.

The unmanned aircraft identity is not only a simple device identifier, but also an identifier related to a plurality of aspects such as manufacturing, registration and filing, and use and operation. However, at present, for various identities of the unmanned aircraft, each manufacturer has a storage manner and location of the manufacturer, and there is no unified standard or specification. Most unmanned aircraft devices have only a part of identities, and consequently, information reading and information tracking of the whole life cycle of the unmanned aircraft cannot be completed. Implementation of the technology management and control system of which the unmanned aircraft is identifiable, monitorable, and traceable is not ideal.

SUMMARY

Embodiments of this application provide an unmanned aircraft identity module and storage method, to implement information reading and information tracking of a whole life cycle of an unmanned aircraft.

To achieve the foregoing objective, the following technical solutions are used in the embodiments of this application.

According to a first aspect, an unmanned aircraft identity module is provided, and the unmanned aircraft identity module includes a processor and a memory, where the memory includes a non-rewritable memory area, an authorizedly rewritable memory area, and a repeatedly rewritable memory area. Specifically, the processor is configured to: obtain a physical identifier of an unmanned aircraft, and write the physical identifier into the non-rewritable memory area; obtain an access identifier of the unmanned aircraft, and write the access identifier into the authorizedly rewritable memory area; and obtain an application identifier of the unmanned aircraft, and write the application identifier into the repeatedly rewritable memory area. The physical identifier is an unmodifiable hardware identifier of the unmanned aircraft; the access identifier is a subscription service identifier of the unmanned aircraft; and the application identifier is a flight-related identifier of the unmanned aircraft.

According to the unmanned aircraft identity module provided in this application, unmanned aircraft identities are classified and stored in memory areas of different characteristics, and a storage manner and a storage location of the unmanned aircraft identity are standardized. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

With reference to the first aspect, in a possible implementation, the non-rewritable memory area, the authorizedly rewritable memory area, and the repeatedly rewritable memory area in the unmanned aircraft identity module may be deployed in one or more hardware units in the unmanned aircraft in which the unmanned aircraft identity module is located. In this implementation, storage locations of various unmanned aircraft identifiers may be deployed based on an actual requirement, and application of the unmanned aircraft identifiers is flexible.

When the non-rewritable memory area, the authorizedly rewritable memory area, and the repeatedly rewritable memory area in the unmanned aircraft identity module are deployed in one hardware unit in the unmanned aircraft, the memory of the unmanned aircraft identity module is an independent hardware unit. When the non-rewritable memory area, the authorizedly rewritable memory area, and the repeatedly rewritable memory area in the unmanned aircraft identity module are deployed in a plurality of hardware units in the unmanned aircraft, the memory of the unmanned aircraft identity module is a functional unit in distributed deployment.

With reference to any one of the first aspect or the foregoing possible implementations, in another possible implementation, the unmanned aircraft identity module may be further located in a flight control module, and the flight control module is configured to implement a flight control processing function of the unmanned aircraft. The non-rewritable memory area, the authorizedly rewritable memory area, and the repeatedly rewritable memory area of the memory of the unmanned aircraft identity module are deployed in the flight control module. A read-only memory (read-only memory, ROM) area of the flight control module includes the non-rewritable memory area storing the physical identifier of the unmanned aircraft. A random access memory (random access memory, RAM) area of the flight control module includes the authorizedly rewritable memory area storing the access identifier of the unmanned aircraft. An electrically erasable programmable read-only memory (electrically erasable programmable read-only memory, EEPROM) area of the flight control module includes the repeatedly rewritable memory area storing the application identifier of the unmanned aircraft. The flight control module is a basic unit of the unmanned aircraft, and is a module included by all types of unmanned aircrafts. Therefore, the memory areas for storing the unmanned aircraft identifiers are deployed in the flight control module. At least one embodiment has strong independence and has an interface that is easy to be standardized and read, and is applicable to all types of unmanned aircrafts.

With reference to any one of the first aspect or the foregoing possible implementations, in another possible implementation, the unmanned aircraft identity module may be further located in an on-board computer, and the on-board computer is configured to implement a flight task processing function of the unmanned aircraft. The non-rewritable memory area, the authorizedly rewritable memory area, and the repeatedly rewritable memory area of the memory of the unmanned aircraft identity module are deployed on the on-board computer in the unmanned aircraft. A ROM area of a memory of the on-board computer includes the non-rewritable memory area storing the physical identifier of the unmanned aircraft. A RAM area of the memory of the on-board computer includes the authorizedly rewritable memory area storing the access identifier of the unmanned aircraft. A secure digital memory card (secure digital memory card, SD card) area of the memory of the on-board computer includes the repeatedly rewritable memory area storing the application identifier of the unmanned aircraft. Because the on-board computer is used by an unmanned aircraft manufacturer, and has strong expansibility, each manufacturer can define a package driver and a package interface of the on-board computer, and this implementation is highly popularized.

With reference to any one of the first aspect or the foregoing possible implementations, in another possible implementation, the unmanned aircraft identity module may be further located in an on-board computer, and the on-board computer is configured to implement a flight task processing function of the unmanned aircraft. The on-board computer includes an embedded subscriber identification module (embedded subscriber identification module, eSIM) card or an embedded universal integrated circuit card (embedded universal integrated circuit card, eUICC) card. The non-rewritable memory area, the authorizedly rewritable memory area, and the repeatedly rewritable memory area of the memory of the unmanned aircraft are deployed in the eSIM card or the eUICC card of the on-board computer. The eSIM card or the eUICC card is integrated into the on-board computer. In the solution of this implementation, a standardized eSIM or eUICC file format, read/write interface, and the like may be defined, to facilitate integration by the unmanned aircraft manufacturer.

With reference to any one of the first aspect or the foregoing possible implementations, in another possible implementation, the unmanned aircraft identity module may be further located in an on-board computer. The on-board computer includes an eSIM card or an eUICC card, and the on-board computer further includes an SD card. The non-rewritable memory area and the authorizedly rewritable memory area of the memory of the unmanned aircraft identity module are deployed in the eSIM card or the eUICC card, and the repeatedly rewritable memory area of the memory of the unmanned aircraft identity module is deployed in the SD card. The SD card is used to replace limited memories of the eUICC card to improve a capacity of storing unmanned aircraft identifiers.

With reference to any one of the first aspect or the foregoing possible implementations, in another possible implementation, the unmanned aircraft identity module may be further independently designed. In this implementation, a dedicated module is configured to store the unmanned aircraft identifier, and reliability and security are high.

With reference to any one of the first aspect or the foregoing possible implementations, in another possible implementation, the identity module includes a backup power supply and a communication module. When an unmanned aircraft accident occurs, the unmanned aircraft identity module is configured to send a wireless signal by using the backup power supply and the communication module, so that the unmanned aircraft identity module is captured, to implement data query when the unmanned aircraft crashes.

Further, the memory of the unmanned aircraft identity module is coupled to the processor of the unmanned aircraft identity module, and a function of the processor is implemented when the processor executes instructions stored in the memory.

According to a second aspect, an unmanned aircraft identity storage method is provided, where the method is applied to an unmanned aircraft identity module, and the unmanned aircraft identity module is configured with a non-rewritable memory area, an authorizedly rewritable memory area, and a repeatedly rewritable memory area. The method may specifically include: obtaining a physical identifier of an unmanned aircraft, and writing the physical identifier into the non-rewritable memory area, where the physical identifier is an unmodifiable hardware identifier of the unmanned aircraft; obtaining an access identifier of the unmanned aircraft, and writing the access identifier into the authorizedly rewritable memory area, where the access identifier is a subscription service identifier of the unmanned aircraft; and obtaining an application identifier of the unmanned aircraft, and writing the application identifier into the repeatedly rewritable memory area, where the application identifier is a flight-related identifier of the unmanned aircraft.

According to the unmanned aircraft identity storage method provided in this application, unmanned aircraft identities are classified and stored in memory areas of different characteristics, and a storage manner and a storage location of the unmanned aircraft identity are standardized. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

It should be noted that, for specific implementation of the unmanned aircraft identity storage method provided in the second aspect, refer to the specific implementation in the first aspect, and details are not described herein again.

According to a third aspect, a processing apparatus is provided. The apparatus may be an apparatus or a chip system in an unmanned aircraft, or an apparatus that can match an unmanned aircraft for use. The apparatus or the unmanned aircraft is configured with a non-rewritable memory area, an authorizedly rewritable memory area, and a repeatedly rewritable memory area that are used to store unmanned aircraft identities. The processing apparatus may implement functions in the foregoing aspects or possible designs, and the functions may be implemented by hardware, or may be implemented by hardware by executing corresponding software. The hardware or the software includes one or more modules corresponding to the foregoing functions. For example, the processing apparatus includes an obtaining unit and a writing unit.

The obtaining unit is configured to obtain an identifier of the unmanned aircraft, where the identifier includes a physical identifier, an access identifier, and an application identifier. The writing unit is configured to: write the physical identifier into the non-rewritable memory area, write the access identifier into the authorizedly rewritable memory area, and write the application identifier into the repeatedly rewritable memory area. The physical identifier is an unmodifiable hardware identifier of the unmanned aircraft; the access identifier is a subscription service identifier of the unmanned aircraft; and the application identifier is a flight-related identifier of the unmanned aircraft.

According to the processing apparatus provided in this application, unmanned aircraft identities are classified and stored in memory areas of different characteristics, and a storage manner and a storage location of the unmanned aircraft identity are standardized. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

It should be noted that, for specific implementation of the processing apparatus provided in the third aspect, refer to the specific implementation in the first aspect, and details are not described herein again.

According to a fourth aspect, at least one embodiment of this application further provides a non-transitory computer-readable storage medium, including instructions. When the instructions are run on a computer, the computer is enabled to perform the unmanned aircraft identity storage method according to any one of the foregoing aspects or the possible implementations.

According to a fifth aspect, at least one embodiment of this application further provides a computer program product. When the computer program product runs on a computer, the computer is enabled to perform the unmanned aircraft identity storage method according to any one of the foregoing aspects or the possible implementations.

According to a sixth aspect, at least one embodiment of this application provides a chip system. The chip system includes a processor, and may further include a memory, and is configured to implement a function in the foregoing methods. The chip system may include a chip, or may include a chip and another discrete component.

The solutions provided in the fourth aspect to the sixth aspect are used to implement the unmanned aircraft identity storage method provided in the second aspect. Therefore, a beneficial effect achieved by the fourth aspect to the sixth aspect may be the same as that achieved by the second aspect, and details are not described herein again.

DETAILED DESCRIPTION OF EMBODIMENTS

In the embodiments of this application, the word such as "example" or "for example" is used to represent giving an example, an illustration, or a description. Any embodiment or design solution described as an "example" or "for example" in the embodiments of this application should not be explained as being more preferred or having more advantageous than another embodiment or design solution. Exactly, use of the word such as "example" or "for example" is intended to present a relative concept in a specific manner for ease of understanding.

In the descriptions of this application, "I" represents an "or" relationship between associated objects unless otherwise specified. For example, A/B may represent A or B. The term "and/or" in this application indicates merely an association relationship for describing associated objects and indicates that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In the embodiments of this application, "at least one" may also be described as "one or more", and "a plurality of" may be "two, three, four, or more". This is not limited in this application.

The solutions provided in the embodiments of this application may be applied to an unmanned aircraft, and the unmanned aircraft may also be referred to as an unmanned aerial vehicle (unmanned aerial vehicle, UAV).

Figure 1:
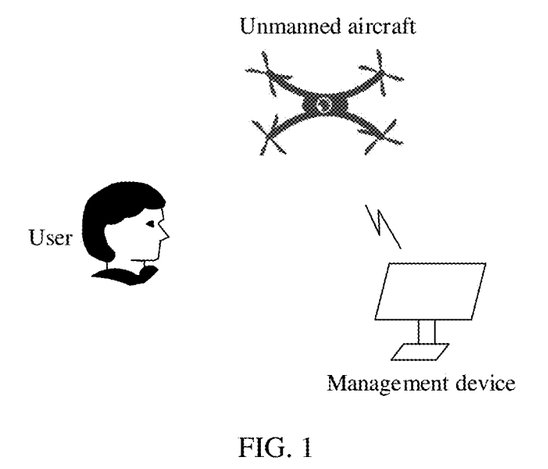
FIG. 1 is a schematic diagram of an unmanned aircraft application scenario according to at least one embodiment of this application.

FIG. 1 is a schematic diagram of an unmanned aircraft application scenario. The scenario includes an unmanned aircraft, an unmanned aircraft management device, and an unmanned aircraft user. Certainly, FIG. 1 is merely an example, and is not a specific limitation.

Figure 2:
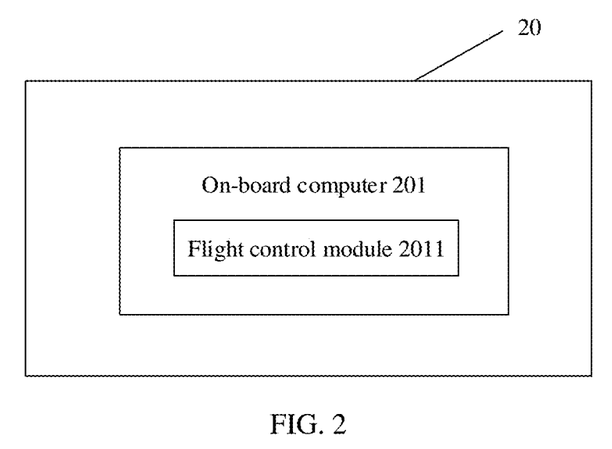
FIG. 2 is a schematic diagram of an internal architecture of an unmanned aircraft according to at least one embodiment of this application.

FIG. 2 is a diagram of an internal architecture of an unmanned aircraft 20. The unmanned aircraft 20 may include an on-board computer 201, and a flight control module 2011 is deployed on the on-board computer 201.

The on-board computer 201 may be an integrated circuit board on which an electronic component and various connectors are deployed. The flight control module 2011 is the electronic component deployed on the integrated circuit. For example, a central processor unit (central processing unit, CPU) is further deployed on the on-board computer 201, to implement a processing function of the unmanned aircraft. For example, a memory is further deployed on the on-board computer 201, to store instruction code and data. For example, an SD card may be further deployed on the on-board computer 201, to extend a storage function of the unmanned aircraft. Certainly, another electronic component may also be deployed on the integrated circuit board, to extend various functions of the unmanned aircraft. Details are not described herein again.

Figure 3:
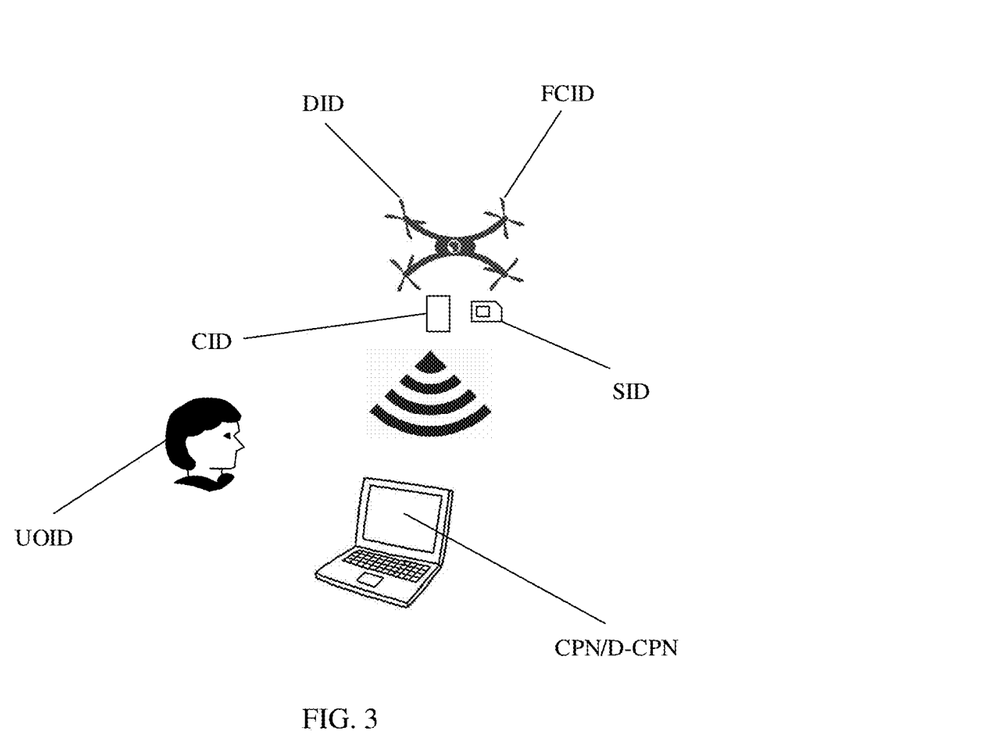
FIG. 3 is a schematic diagram of classification of unmanned aircraft identities according to at least one embodiment of this application.

This application relates to unmanned aircraft identity storage. An unmanned aircraft identity is not only a simple device identifier, but also an identifier related to a plurality of aspects such as manufacturing, registration and filing, and use and operation. For example, as shown in FIG. 3, the unmanned aircraft identity may include a device identity (device identity, DID), a flight control identity (fly control identity, FCID), a communication identity (communication identity, CID), a subscription identifier (sign identifier, SID), an unmanned aircraft system operator identity (unmanned aircraft system operator identity, UOID), a cloud provider number (cloud provider number, CPN), a dynamic cloud provider number (dynamic cloud provider number, D-CPN), or the like. Currently, the unmanned aircraft identities are distributed in different devices in the unmanned aircraft, and there is no unified standard or specification.

Based on this, this application provides an unmanned aircraft and an unmanned aircraft identity storage method. A basic principle of the method is that the unmanned aircraft identities are classified into a physical identifier, an access identifier, and an application identifier based on application characteristics of the unmanned aircraft identities, and different types of identities are stored in memory areas of different characteristics. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

The physical identifier is unchangeable physical information of the unmanned aircraft, and is written by an unmanned aircraft manufacturer in a production phase. The physical identifier may include one or more of the following identifiers: an entire device identifier, a communication module identifier, a flight control module identifier, an encryption key, a black box device identifier, an engine/motor identifier, another device identifier, and the like.

The access identifier is a subscription service identifier of the unmanned aircraft, and the access identifier is generated in an unmanned aircraft subscription phase. The access identifier is authorizedly rewritable information of the unmanned aircraft, and is written by an unmanned aircraft user before the unmanned aircraft is used. The access identifier may include one or more of the following identifiers: owner registration information, operator registration information, communication service provider subscription information, communication key information, and the like.

The application identifier is a flight-related identifier of the unmanned aircraft, and is repeatedly rewritable information of the unmanned aircraft, written by an on-board CPU of the unmanned aircraft in a use phase. The application identifier may include one or more of the following identifiers: a transmission identifier, a flight path identifier, a flight direction identifier, a speed identifier, an altitude identifier, a longitude and latitude identifier, a timestamp identifier, and the like.

Specifically, the unmanned aircraft identities are respectively stored in three types of memory areas: a non-rewritable area storing the physical identifier, an authorizedly rewritable area storing the access identifier, and a repeatedly rewritable area storing the application identifier.

The following describes implementations of the embodiments of this application in detail with reference to the accompanying drawings.

Figure 4:
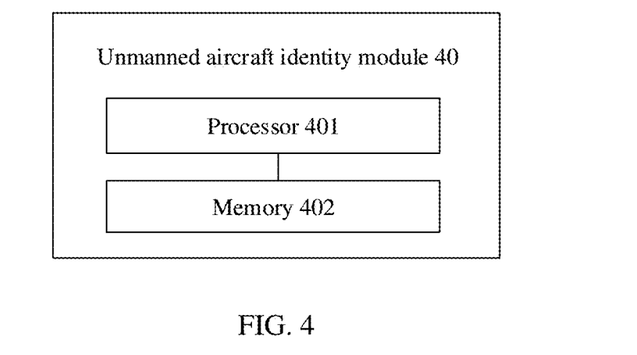
FIG. 4 is a schematic structural diagram of an unmanned aircraft identity module according to at least one embodiment of this application.

According to an aspect, at least one embodiment of this application provides an unmanned aircraft identity module. FIG. 4 is a schematic composition diagram of an unmanned aircraft identity module 40 according to at least one embodiment of this application. As shown in FIG. 4, the unmanned aircraft identity module 40 may include a processor 401 and a memory 402. The memory 402 includes a non-rewritable memory area, an authorizedly rewritable memory area, and a repeatedly rewritable memory area.

The processor 401 may be one processor, or may be a collective name of a plurality of processing elements. For example, the processor 401 may be a CPU, or an application-specific integrated circuit (application-specific integrated circuit, ASIC), or may be configured as one or more integrated circuits implementing at least one embodiment of this application, for example, one or more microprocessors (digital signal processors, DSPs) or one or more field programmable gate arrays (field programmable gate arrays, FPGAs). The processor 401 may implement various functions by running or executing a software program stored in the memory 402 and invoking data stored in the memory 402.

Specifically, the processor 401 is configured to: obtain a physical identifier of an unmanned aircraft, and write the physical identifier into the non-rewritable memory area; obtain an access identifier of the unmanned aircraft, and write the access identifier into the authorizedly rewritable memory area; and obtain an application identifier of the unmanned aircraft, and write the application identifier into the repeatedly rewritable memory area. The physical identifier is an unmodifiable hardware identifier of the unmanned aircraft; the access identifier is a subscription service identifier of the unmanned aircraft; and the application identifier is a flight-related identifier of the unmanned aircraft.

The physical identifier of the unmanned aircraft obtained by the processor 401 may be directly written by an unmanned aircraft manufacturer in a production phase, so that the processor 401 obtains the physical identifier. The access identifier of the unmanned aircraft obtained by the processor 401 may be entered by an unmanned aircraft user through an unmanned aircraft user interface in a subscription phase, so that the processor 401 obtains the access identifier. The application identifier of the unmanned aircraft obtained by the processor 401 may be entered by the unmanned aircraft user through the unmanned aircraft user interface in a phase of using the unmanned aircraft, so that the processor 401 obtains the application identifier. Certainly, the processor 401 may alternatively obtain an unmanned aircraft identity in another manner. This is not specifically limited in at least one embodiment of this application.

It should be noted that the non-rewritable memory area, the authorizedly rewritable memory area, and the repeatedly rewritable memory area in the unmanned aircraft identity module 40 may be deployed in one or more hardware units in the unmanned aircraft. This is not specifically limited in at least one embodiment of this application.

When the non-rewritable memory area, the authorizedly rewritable memory area, and the repeatedly rewritable memory area in the unmanned aircraft identity module 40 are deployed in one hardware unit in the unmanned aircraft, the memory 402 may be an independent hardware unit. When the non-rewritable memory area, the authorizedly rewritable memory area, and the repeatedly rewritable memory area in the unmanned aircraft identity module 40 are deployed in a plurality of hardware units in the unmanned aircraft, the memory 402 may be a functional unit in distributed deployment.

The following shows several solutions in which the non-rewritable memory area, the authorizedly rewritable memory area, and the repeatedly rewritable memory area that are used to store unmanned aircraft identities are deployed in the unmanned aircraft. However, this does not constitute a limitation. Any manner in which unmanned aircraft identities are classified and stored in different areas falls within the protection scope of this application.

Example 1: An identity module is located on a flight control module, and an unmanned aircraft identity is stored on the flight control module.

The flight control module is configured to implement a flight control processing function of an unmanned aircraft, and is a mandatory device of the unmanned aircraft. The flight control module has an internal memory, including: a ROM, a RAM an EEPROM, and the like. In the example 1, a non-rewritable memory area, an authorizedly rewritable memory area, and a repeatedly rewritable memory area in the memory of the flight control module of the unmanned aircraft that are used to store the unmanned aircraft identities are deployed in the flight control module. In the example 1, a ROM area of the flight control module includes the non-rewritable memory area storing a physical identifier of the unmanned aircraft. A RAM area of the flight control module includes the authorizedly rewritable memory area storing an access identifier of the unmanned aircraft. An EEPROM area of the flight control module includes the repeatedly rewritable memory area storing an application identifier of the unmanned aircraft.

Specifically, in the example 1, a flight control module manufacturer generally writes a flight control identifier into the ROM area of the flight control module, and the ROM area may be extended to include another physical identifier. The RAM area of the flight control module is generally used to load a program area, and a part of the RAM area may be reserved to store the access identifier. A FLASH/DDR area in the EEPROM of the flight control module is generally used to load a program and store data, and a part of the FLASH/DDR area may be reserved to store black box information such as the application identifier and log information.

Example 2: An unmanned aircraft identity module is located in an on-board computer, and an unmanned aircraft identity is stored in a memory of the on-board computer.

The on-board computer is configured to implement a flight task processing function of an unmanned aircraft, for example, obstacle avoidance, dot flight, and other task processing functions. The on-board computer also has a memory, including a ROM, a RAM, an SD card, and the like, so that the memory may be used to store the unmanned aircraft identity. In the example 2, a ROM area of the memory of the on-board computer includes a non-rewritable memory area that stores a physical identifier of the unmanned aircraft in the unmanned aircraft identity module. A RAM area of the memory of the on-board computer includes an authorizedly rewritable memory area that stores an access identifier of the unmanned aircraft in the unmanned aircraft identity module. An SD card area of the memory of the on-board computer includes a repeatedly rewritable memory area that stores an application identifier of the unmanned aircraft in the unmanned aircraft identity module.

Figure 5A:
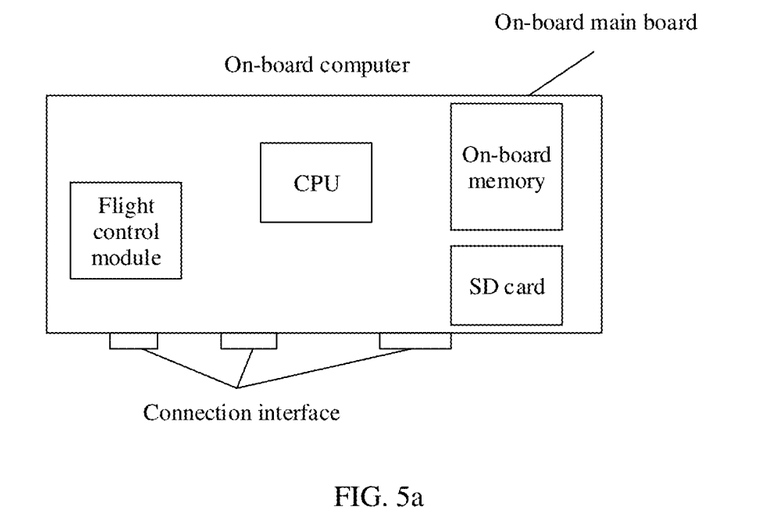
FIG. 5A is a schematic structural diagram of an on-board computer according to at least one embodiment of this application.

FIG. 5A shows a structure of an on-board computer in an unmanned aircraft. As shown in FIG. 5A, the on-board computer is located on an on-board main board (that is, a printed circuit board), and a flight control module, a CPU, an on-board memory, an SD card, a connection interface, and the like may be deployed on the on-board computer. An unmanned aircraft identity may be stored in the on-board memory of the on-board computer.

It should be noted that FIG. 5A is merely an example for describing the structure of the on-board computer, and does not constitute a specific limitation. In actual application, another functional element may be deployed on the on-board main board based on an actual requirement, to implement various functions of the on-board computer.

Specifically, in the example 2, an entire device manufacturer generally writes an entire device identifier into the ROM area of the on-board computer, and the ROM area may be extended so that another physical identifier can be written. The RAM area of the on-board computer is generally used to load a program area, and a part of the RAM area may be reserved to store the access identifier. The SD card area of the on-board computer is generally used to store data, a log, and the like, and a part of the SD card area may be reserved to store black box information such as the application identifier and log information.

Example 3: An unmanned aircraft identity module is located in an on-board computer, an eUICC or an eSIM is deployed on the on-board computer of an unmanned aircraft, and unmanned aircraft identities are stored in different memory areas in the eUICC or the eSIM of the on-board computer.

Figure 5B:
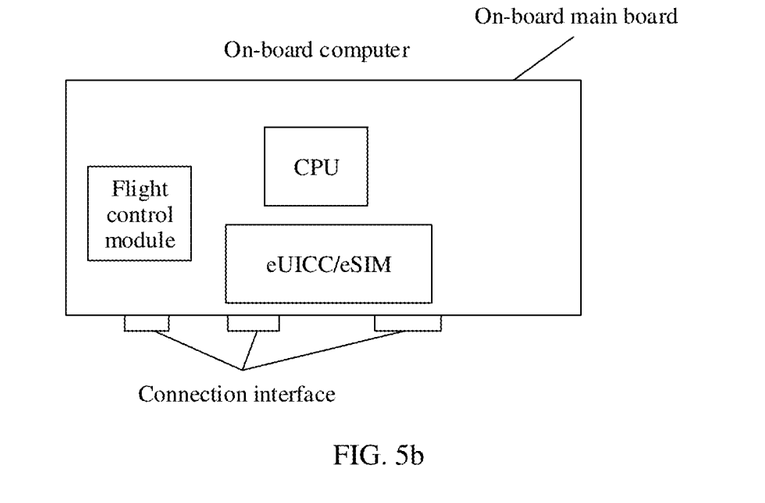
FIG. 5B is a schematic structural diagram of another on-board computer according to at least one embodiment of this application.

FIG. 5B shows another structure of an on-board computer in an unmanned aircraft. As shown in FIG. 5B, the on-board computer is located on an on-board main board (that is, a printed circuit board), and a flight control module, a CPU, an eUICC/eSIM, a connection interface, and the like may be deployed on the on-board computer. An unmanned aircraft identity may be stored in an on-board memory of the on-board computer.

The eUICC/eSIM may include an issuer security domain-profile (issuer security domain-profile, ISD-P), an issuer security domain-root (issuer security domain-root, ISD-R), an eUICC certificate authority security domain (eUICC certificate authority security domain, ECASD), an eUICC operating system (operating system), and the like.

Specifically, when the eUICC or the eSIM is delivered, an unmanned aircraft identity configuration area (such as a DID Profile) is configured, to store unmanned aircraft identity information. In a policy rules enforcer (policy rules enforcer), the configuration area is configured to be undeletable (disable), authorizedly rewritable, or rewritable, and is configured with a corresponding read/write interface. According to the rules, three areas are defined and configured with policy rules (policy rules). The three areas are respectively referred to as a physical identifier information area (configured to be non-rewritable, and used to store a physical identifier), an access identifier information area (configured to include a communication key and need to be authorizedly rewritable, and used to store an access identifier), and an application identifier information area (configured to be rewritable, and used to store an application identifier).

Optionally, an unmanned aircraft identity root key may be stored in the ECASD, and is used for authentication and authorization to update the access identifier.

Optionally, because a memory of the eUICC is limited, more application identifier information may be stored by using an SD card area.

Example 4: An unmanned aircraft identity module is located in an on-board computer. An eUICC or an eSIM is deployed on the on-board computer of an unmanned aircraft, and an SD card is further deployed on the on-board computer. Unmanned aircraft identities are stored in different areas in the eUICC or the eSIM of the on-board computer and stored in the SD card of the on-board computer.

Specifically, in the example 4, a non-rewritable memory area that is used to store a physical identifier in a memory of the unmanned aircraft identity module and an authorizedly rewritable memory area that is used to store an access identifier in the memory of the unmanned aircraft identity module are deployed in the eSIM or the eUICC. A repeatedly rewritable memory area that is used to store an application identifier in the memory of the unmanned aircraft identity module is deployed in the SD card.

Example 5: An unmanned aircraft identity module is independently deployed.

Specifically, the unmanned aircraft identity module is dedicated to storage of an unmanned aircraft identity, and is a small-scale on-board computer unit.

Optionally, the unmanned aircraft identity module may be configured with a black box function, including a backup power supply and a communication module. During normal operating, external power supplying ensures that a networked flight management requirement is met and an unmanned aircraft identity and status information are recorded and stored. Information is received and sent by using the communication module (for example, an enhanced machine type communication (enhanced machine type communication, eMTC) mode). When an abnormal accident occurs, a black box design requirement is met by using the backup power supply; when an unmanned aircraft accident occurs, a wireless signal is sent by using the communication module (such as a narrow band internet of things (narrow band internet of things, NB-IoT)/radio frequency identification (radio frequency identification, RFID)), so that the unmanned aircraft identity module is captured.

Figure 6:
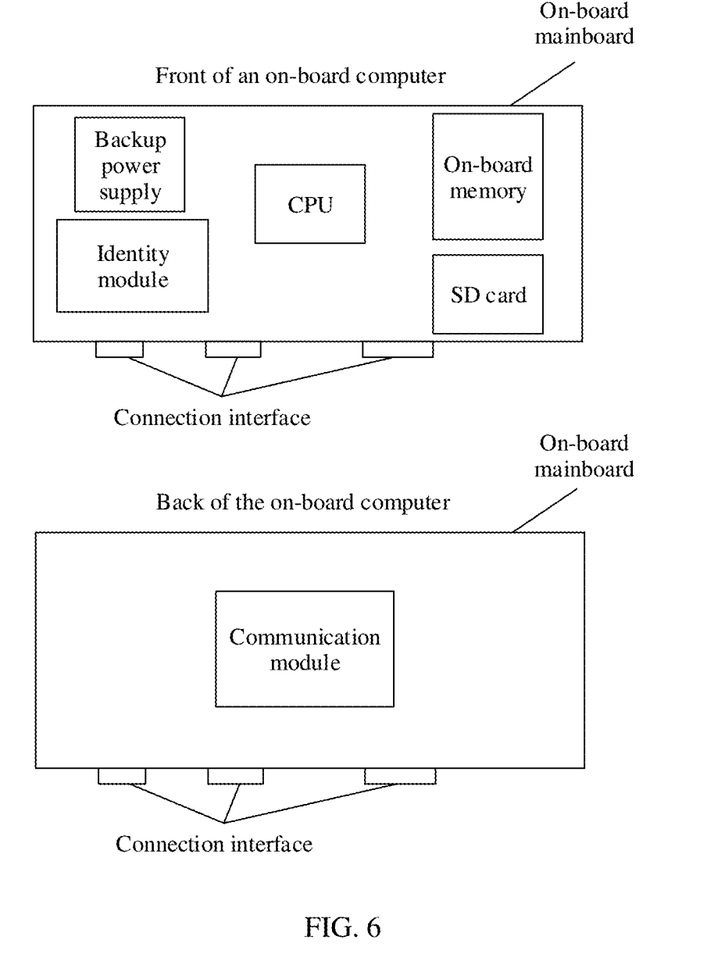
FIG. 6 is a schematic structural diagram of still another on-board computer according to at least one embodiment of this application.

FIG. 6 shows a front and rear structure of an on-board computer in an unmanned aircraft, to implement storage of the unmanned aircraft identity in the example 5. The on-board computer is located on the front of an on-board main board (that is, a printed circuit board), and an unmanned aircraft identity module, a backup power supply, a flight control module, a CPU, an on-board memory, a connection interface, and the like are deployed on the on-board computer. The on-board computer is located on the back of the on-board main board, and a communication module is deployed on the on-board computer. The on-board computer shown in FIG. 6 may implement the solution of storing the unmanned aircraft identity in the example 5.

It should be noted that FIG. 6 is merely an example for describing the structure of the on-board computer, and does not constitute a specific limitation. In actual application, another functional element may be deployed on the on-board main board based on an actual requirement, to implement various functions of the on-board computer.

According to the unmanned aircraft identity module 40 provided in this application, unmanned aircraft identities are classified and stored in memory areas of different characteristics, and a storage manner and a storage location of the unmanned aircraft identity are standardized. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

Figure 7:
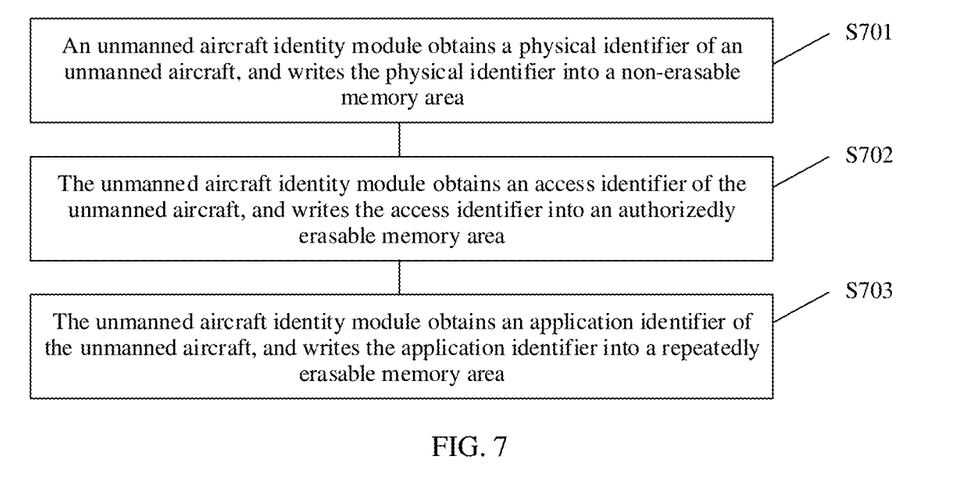
FIG. 7 is a flowchart of an unmanned aircraft identity storage method according to at least one embodiment of this application.

According to another aspect, at least one embodiment of this application provides an unmanned aircraft identity storage method, to store an unmanned aircraft identity. The unmanned aircraft identity includes a physical identifier, an access identifier, and an application identifier. A definition of each identifier is described in detail in the foregoing content, and details are not described herein again. As shown in FIG. 7, the method may include the following steps.

S701: An unmanned aircraft identity module obtains a physical identifier of an unmanned aircraft, and writes the physical identifier into a non-rewritable memory area.

The physical identifier of the unmanned aircraft obtained by the unmanned aircraft identity module may be directly written by an unmanned aircraft manufacturer in a production phase, so that the unmanned aircraft identity module obtains the physical identifier. Certainly, the unmanned aircraft identity module may alternatively obtain the physical identifier of the unmanned aircraft in another manner. This is not specifically limited in at least one embodiment of this application.

S702: The unmanned aircraft identity module obtains an access identifier of the unmanned aircraft, and writes the access identifier into an authorizedly rewritable memory area.

The access identifier of the unmanned aircraft obtained by the unmanned aircraft identity module may be entered by an unmanned aircraft user through an unmanned aircraft user interface in a subscription phase, so that the unmanned aircraft identity module obtains the access identifier. Certainly, the unmanned aircraft identity module may alternatively obtain the access identifier of the unmanned aircraft in another manner. This is not specifically limited in at least one embodiment of this application.

S703: The unmanned aircraft identity module obtains an application identifier of the unmanned aircraft, and writes the application identifier into a repeatedly rewritable memory area.

The application identifier of the unmanned aircraft obtained by the unmanned aircraft identity module may be entered by the unmanned aircraft user through the unmanned aircraft user interface in a phase of using the unmanned aircraft, so that the unmanned aircraft identity module obtains the application identifier. Certainly, the unmanned aircraft identity module may alternatively obtain the application identifier of the unmanned aircraft in another manner. This is not specifically limited in at least one embodiment of this application.

It should be noted that the unmanned aircraft identity storage method shown in FIG. 7 is implemented by the foregoing unmanned aircraft identity module 40. Therefore, for specific implementation of the unmanned aircraft identity storage method shown in FIG. 7, refer to the specific implementation of the foregoing unmanned aircraft identity module 40. Details are not described herein again.

According to the unmanned aircraft identity storage method provided in this application, unmanned aircraft identities are classified and stored in memory areas of different characteristics, and a storage manner and a storage location of the unmanned aircraft identity are standardized. In this way, locations of the memory areas of different characteristics and classifications to which the unmanned aircraft identities belong may be configured based on an unmanned aircraft management requirement, to perform, based on the management requirement, information reading and information tracking on a whole life cycle of the unmanned aircraft.

Figure 8:
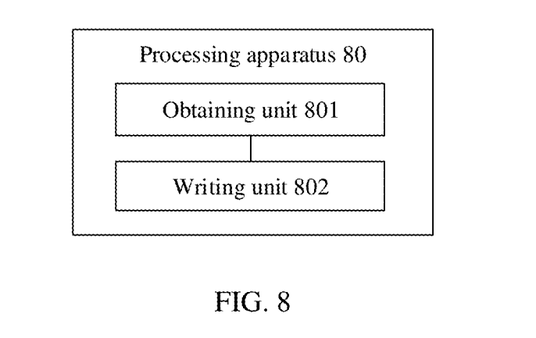
FIG. 8 is a schematic structural diagram of a processing apparatus according to at least one embodiment of this application.

According to another aspect, at least one embodiment of this application further provides a processing apparatus 80. The processing apparatus 80 may be an apparatus or a chip system in an unmanned aircraft, or an apparatus that can match an unmanned aircraft for use. The processing apparatus 80 or the unmanned aircraft is configured with a non-rewritable memory area, an authorizedly rewritable memory area, and a repeatedly rewritable memory area. The processing apparatus 80 may implement functions in the foregoing embodiments, and the functions may be implemented by hardware, or may be implemented by hardware by executing corresponding software. The hardware or the software includes one or more modules corresponding to the foregoing functions. As shown in FIG. 8, the processing apparatus 80 may include an obtaining unit 801 and a writing unit 802 that are configured to support the processing apparatus 80 in implementing the processes S701 to S703 in the foregoing method embodiments.

In another form of at least one embodiment, a non-transitory computer-readable storage medium is provided. The computer-readable storage medium stores instructions. When the instructions are executed, the methods in the foregoing method embodiments are performed.

In another form of at least one embodiment, a computer program product including instructions is provided. When the instructions are executed, the methods in the foregoing method embodiments are performed.

At least one embodiment of this application further provides a chip system. The chip system includes a processor, configured to implement the technical methods in some embodiments. In a possible design, the chip system further includes a memory, configured to store a program instruction and/or data that are/is necessary for the embodiments. In a possible design, the chip system further includes a memory, configured for the processor to invoke application program code stored in the memory. The chip system may include one or more chips, or may include a chip and another discrete device. This is not specifically limited in at least one embodiment of this application.

The method or algorithm steps described with reference to the content disclosed in this application may be implemented by hardware, or may be implemented by a processor by executing a software instruction. The software instruction may include a corresponding software module. The software module may be stored in a RAM, a flash memory, a ROM, an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium, and write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist as discrete components in a core network interface device. Alternatively, the memory may be coupled to the processor. For example, the memory may exist independently, and is connected to the processor by using a bus. The memory may alternatively be integrated with the processor. The memory may be configured to store application program code for executing the technical solutions provided in the embodiments of this application, and the processor controls the execution. The processor is configured to execute the application program code stored in the memory, to implement the technical solutions provided in the embodiments of this application.

Based on the foregoing descriptions of the implementations, a person skilled in the art may clearly understand that for the purpose of convenient and brief descriptions, division into the foregoing functional modules is merely used as an example for illustration. During actual application, the foregoing functions may be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may be one or more physical units, that is, may be located in one place, or may be distributed on a plurality of different places. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An unmanned aircraft identity module, comprising:
a backup power supply;
a communication module;
a processor; and
a memory, wherein
the memory comprises a non-rewritable memory area, an authorizedly rewritable memory area, and a repeatedly rewritable memory area;
the processor is configured to:
obtain a physical identifier of an unmanned aircraft, and write the physical identifier into the non-rewritable memory area, wherein the physical identifier is an unmodifiable hardware identifier of the unmanned aircraft;
obtain an access identifier of the unmanned aircraft, and write the access identifier into the authorizedly rewritable memory area, wherein the access identifier is a subscription service identifier of the unmanned aircraft; and
obtain an application identifier of the unmanned aircraft, and write the application identifier into the repeatedly rewritable memory area, wherein the application identifier is a flight-related identifier of the unmanned aircraft; and
when an accident involving the unmanned aircraft occurs, the unmanned aircraft identity module is configured to send a wireless signal by using the backup power supply and the communication module.

2. The unmanned aircraft identity module according to claim 1, wherein
the non-rewritable memory area, the authorizedly rewritable memory area, and the repeatedly rewritable memory area are deployed in one or more hardware units in the unmanned aircraft in which the unmanned aircraft identity module is located.

3. The unmanned aircraft identity module according to claim 1, wherein
the unmanned aircraft identity module is located in a flight control module, and the flight control module is configured to implement a flight control processing function of the unmanned aircraft;
a read-only memory (ROM) area of the flight control module comprises the non-rewritable memory area;
a random access memory (RAM) area of the flight control module comprises the authorizedly rewritable memory area; and
an electrically erasable programmable read-only memory (EEPROM) area of the flight control module comprises the repeatedly rewritable memory area.

4. The unmanned aircraft identity module according to claim 1, wherein
the unmanned aircraft identity module is located in an on-board computer, and the on-board computer is configured to implement a flight task processing function of the unmanned aircraft;
a read-only memory (ROM) area of a memory of the on-board computer comprises the non-rewritable memory area;
a random access memory (RAM) area of the memory of the on-board computer comprises the authorizedly rewritable memory area; and
a secure digital memory card (SD card) area of the memory of the on-board computer comprises the repeatedly rewritable memory area.

5. The unmanned aircraft identity module according to claim 1, wherein
the unmanned aircraft identity module is located in an on-board computer, the on-board computer is configured to implement a flight task processing function of the unmanned aircraft, and the on-board computer comprises an embedded subscriber identification module (eSIM) card or an embedded universal integrated circuit card (eUICC) card; and
the non-rewritable memory area, the authorizedly rewritable memory area, and the repeatedly rewritable memory area are deployed in the eSIM card or the eUICC card.

6. The unmanned aircraft identity module according to claim 1, wherein
the unmanned aircraft identity module is located in an on-board computer, the on-board computer is configured to implement a flight task processing function of the unmanned aircraft, the on-board computer comprises an embedded subscriber identification module (eSIM) card or an embedded universal integrated circuit card (eUICC) card, and the on-board computer further comprises a secure digital memory card (SD) card; and
the non-rewritable memory area and the authorizedly rewritable memory area are deployed in the eSIM card or the eUICC card, and the repeatedly rewritable memory area is deployed in the SD card.

7. An unmanned aircraft identity storage method, wherein the method is performed at an unmanned aircraft identity module configured with a non-rewritable memory area, an authorizedly rewritable memory area, and a repeatedly rewritable memory area, and the method comprises:
obtaining a physical identifier of an unmanned aircraft, and writing the physical identifier into the non-rewritable memory area, wherein the physical identifier is an unmodifiable hardware identifier of the unmanned aircraft;
obtaining an access identifier of the unmanned aircraft, and writing the access identifier into the authorizedly rewritable memory area, wherein the access identifier is a subscription service identifier of the unmanned aircraft; and
obtaining an application identifier of the unmanned aircraft, and writing the application identifier into the repeatedly rewritable memory area, wherein the application identifier is a flight-related identifier of the unmanned aircraft, wherein the unmanned aircraft identity module is located in an on-board computer, the on-board computer is configured to implement a flight task processing function of the unmanned aircraft, and the on-board computer comprises an embedded subscriber identification module (eSIM) card or an eUICC card; and the non-rewritable memory area and the authorizedly rewritable memory area are deployed in the eSIM card or the eUICC card.

8. The method according to claim 7, wherein the repeatedly rewritable memory area is deployed in a hardware unit in the unmanned aircraft.

9. The method according to claim 7, wherein the on-board computer further comprises a flight control module configured to implement the flight task processing function of the unmanned aircraft.

10. The method according to claim 7, wherein the repeatedly rewritable memory area is deployed in the eSIM card or the eUICC card.

11. The method according to claim 7, wherein the on-board computer further comprises a secure digital memory card (SD) card; and the repeatedly rewritable memory area is deployed in the SD card.

12. The method according to claim 7, wherein the unmanned aircraft identity module further comprises a backup power supply and a communication module, and the method further comprises:

when an accident involving the unmanned aircraft occurs, sending a wireless signal by using the backup power supply and the communication module.

13. A non-transitory computer-readable storage medium, comprising instructions executable by a processor to enable the processor is enabled to:

obtain a physical identifier of an unmanned aircraft, and write the physical identifier into a non-rewritable memory area, wherein the physical identifier is an unmodifiable hardware identifier of the unmanned aircraft;

obtain an access identifier of the unmanned aircraft, and write the access identifier into an authorizedly rewritable memory area, wherein the access identifier is a subscription service identifier of the unmanned aircraft; and obtain an application identifier of the unmanned aircraft, and write the application identifier into a repeatedly rewritable memory area, wherein the application identifier is a flight-related identifier of the unmanned aircraft, wherein the unmanned aircraft comprises an on-board computer configured to implement a flight task processing function of the unmanned aircraft, and the on-board computer comprises an embedded subscriber identification module (eSIM) card or an eUICC card; and the non-rewritable memory area and the authorizedly rewritable memory area are deployed in the eSIM card or the eUICC card.

14. The non-transitory computer-readable storage medium according to claim 13, wherein the repeatedly rewritable memory area is deployed in a hardware unit in the unmanned aircraft.

15. The non-transitory computer-readable storage medium according to 13, wherein the on-board computer further comprises a unmanned aircraft identity module configured to implement the flight task processing function of the unmanned aircraft.

16. The non-transitory computer-readable storage medium according to claim 13, wherein the repeatedly rewritable memory area is deployed in the eSIM card or the eUICC card.

17. The non-transitory computer-readable storage medium according to claim 13, wherein comprises a secure digital memory card (SD) card; and the repeatedly rewritable memory area is deployed in the SD card.

\* \* \* \* \*